(12) United States Patent
Rhee et al.

(10) Patent No.: US 7,069,299 B2
(45) Date of Patent: Jun. 27, 2006

(54) METHOD FOR CREATING AND OPERATING CYBER-CONFERENCE INCLUDING PAPER PRESENTATIONS AND SYSTEM FOR THE SAME

(75) Inventors: Jae Seong Rhee, Seoul (KR); Kang Pyung Lee, Seongnam-si (KR); Young Jun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 640 days.

(21) Appl. No.: 10/029,292

(22) Filed: Dec. 28, 2001

(65) Prior Publication Data

US 2002/0087638 A1    Jul. 4, 2002

(30) Foreign Application Priority Data

Dec. 28, 2000    (KR) ................................ 2000-83423

(51) Int. Cl.
  *G06F 15/16*    (2006.01)
(52) U.S. Cl. ..................................... 709/204
(58) Field of Classification Search .............. 709/204, 709/206, 227
  See application file for complete search history.

(56) References Cited

U.S. PATENT DOCUMENTS

| | | | | |
|---|---|---|---|---|
| 5,347,306 | A * | 9/1994 | Nitta ........................... | 348/14.1 |
| 5,978,835 | A * | 11/1999 | Ludwig et al. ............. | 709/204 |
| 5,999,208 | A * | 12/1999 | McNerney et al. ...... | 348/14.08 |
| 6,219,045 | B1 * | 4/2001 | Leahy et al. ................ | 715/757 |
| 6,330,022 | B1 * | 12/2001 | Seligmann ................ | 348/14.08 |
| 6,343,314 | B1 * | 1/2002 | Ludwig et al. ............. | 709/204 |
| 6,559,863 | B1 * | 5/2003 | Megiddo ..................... | 715/753 |
| 6,742,116 | B1 * | 5/2004 | Matsui et al. ................ | 713/171 |
| 6,760,750 | B1 * | 7/2004 | Boneh et al. ................ | 709/204 |

FOREIGN PATENT DOCUMENTS

KR    2001-0001383    1/2001

OTHER PUBLICATIONS

S. Murase, et al., The Institute of Electronics, Information and Communication Engineers, Technical Report of IEICE, of S 95-12, vol. 95, No. 78, pp. 23-27, "Internet World Congress on Biomedical Science '94-First Internet Conference Held in the W3 Server", May 26, 1995 (with English Abstract).

* cited by examiner

*Primary Examiner*—Krisna Lim
(74) *Attorney, Agent, or Firm*—Oblon, Spivak, McClelland, Maier & Neustadt, P.C.

(57) ABSTRACT

A method and an apparatus for constructing and operating a cyber-conference in cyberspace are disclosed. The method comprises the steps of: accessing a cyber-conference operating web site provided on cyberspace; applying for registration to a cyber-conference operation server; approving the registration based on data stored on a database; and creating a cyber-conference in the cyberspace. The apparatus, which is connected to a user client and a conference client through a communication network, comprises a storage unit for storing a program, embodied on a computer-readable medium, capable of constructing and operating the cyber-conference; a database storing data related to the cyber-conference; and a server connected to the storage unit and the database.

10 Claims, 7 Drawing Sheets

METHOD FOR CREATING AND OPERATING CYBER-CONFERENCE INCLUDING PAPER PRESENTATIONS AND SYSTEM FOR THE SAME

BACKGROUND OF THE INVENTION

1. Field of the Invention

The present invention relates to a method and an apparatus capable of managing conferences; and, more particularly, to a method and an apparatus capable of constructing and operating cyber-conferences in cyberspace.

2. Description of the Related Art

Typically, students and professionals take academic and technical activities by exchanging related information in their scientific and technical fields at a center of conferences existing on off-line, i.e., in real world. Each of the conferences annually holds one or more meetings to promote academic and technical capacities among members. All the members, however, cannot attend the meetings at the same time due to limitations of time and space. Since a meeting is held in a limited period of time, a great deal of subjects issued on the meeting cannot be discussed thoroughly. Consequently, it is very difficult to achieve the original goal of the meeting that promotes academic and technical capacities of the members.

SUMMARY OF THE INVENTION

In order to overcome the aforementioned shortcoming, the present invention provides a method and an apparatus capable of constructing and operating cyber-conferences in cyberspace where a great amount of information is exchanged through a network such as the Internet. In other words, by using the method and the apparatus capable of constructing and operating cyber-conferences in the cyberspace in accordance with the present invention, it is expected to reduce human resources, costs, and time necessary for operating the cyber-conferences and also it is easy to encourage to actively participate in a meeting of the cyber-conference not only the members of the conference but also the general public who are interested in the meeting. Also, one can expect that the individual conferences can examine papers thoughtfully as well as objectively and experts of corresponding technical fields can exchange opinions with each other, so that the advancement of learning can be accomplished. It can be shorten the time that puts research results to practical use.

In accordance with one aspect of the present invention, it is provided a method comprises the steps of: accessing a cyber-conference operating web site provided on cyberspace; applying for registration to a cyber-conference operation server; approving the registration based on data stored on a database; and creating a cyber-conference in the cyberspace.

In accordance with another aspect of the present invention, it is provided an apparatus, which is connected to a user client and a society client through a communication network, comprises a storage unit for storing a program, embodied on a computer-readable medium, capable of constructing and operating the cyber-conference; a database storing data related to the cyber-conference; and a server connected to the storage unit and the database.

BRIEF DESCRIPTIONS OF THE DRAWINGS

The above and other objects and features of the present invention will become apparent from the following description of a preferred embodiment given in conjunction with the accompanying drawings, in which.

Figure 3A:
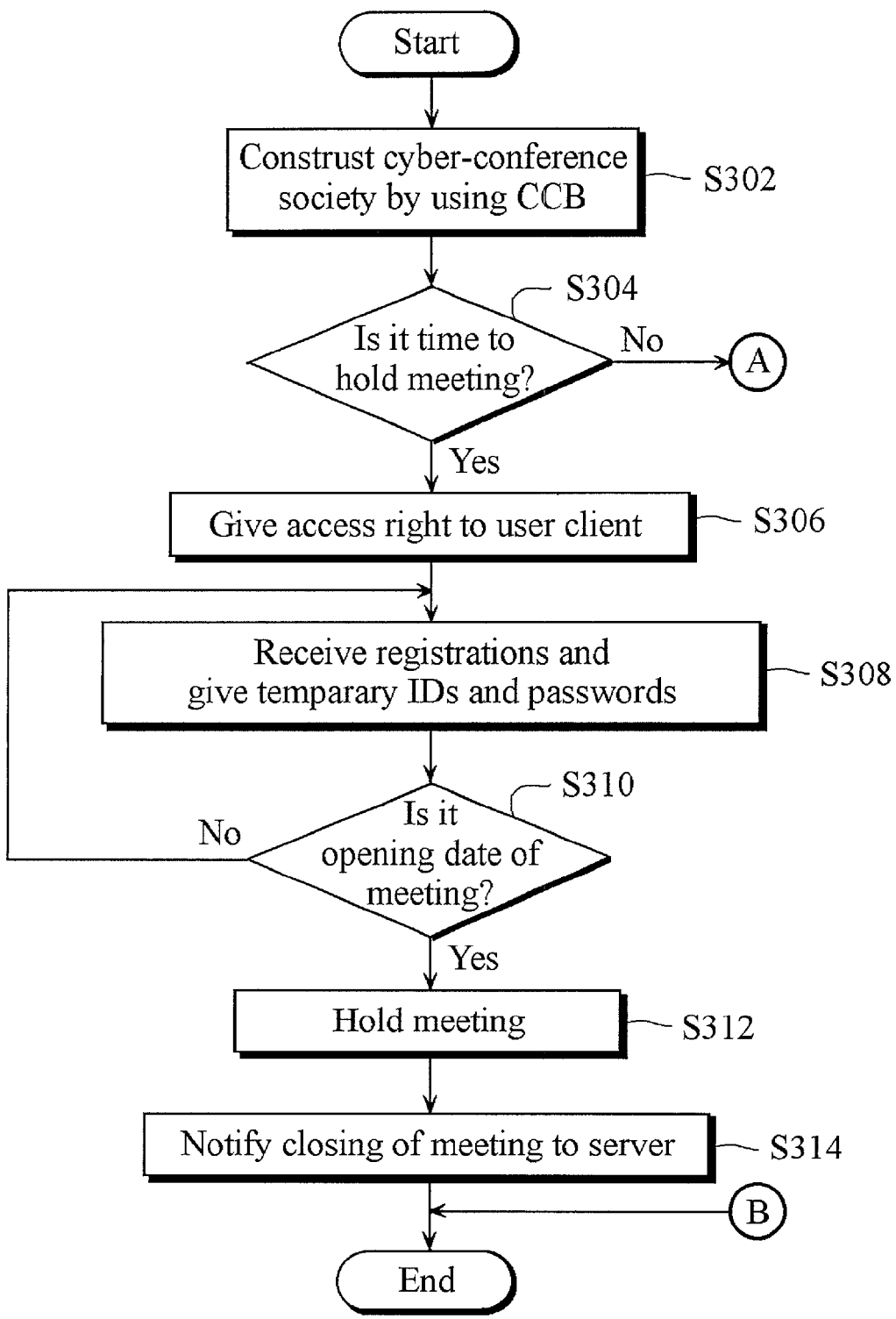
FIGS. 3A and 3B illustrate flow diagrams for explaining the procedure of constructing and operating the cyber-conference in accordance with the present invention.
Figure 4:
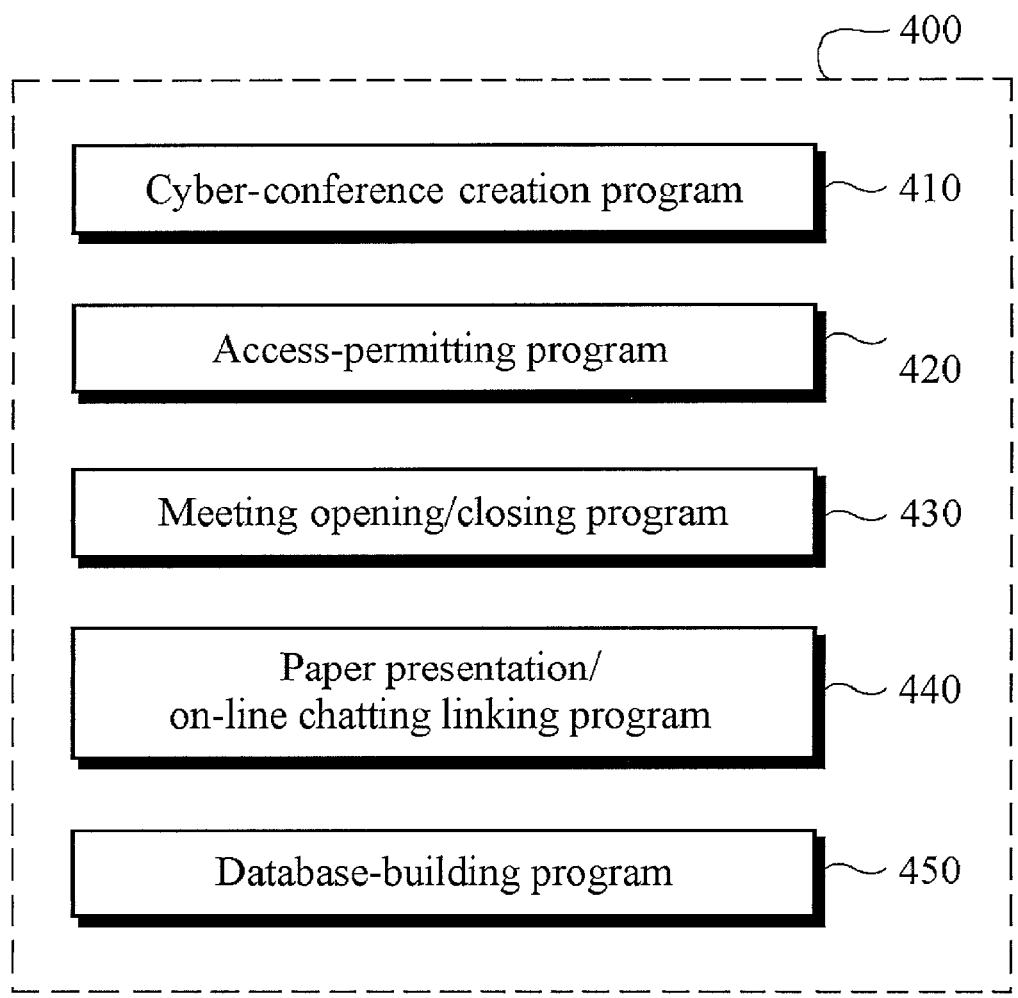
Figure 5:
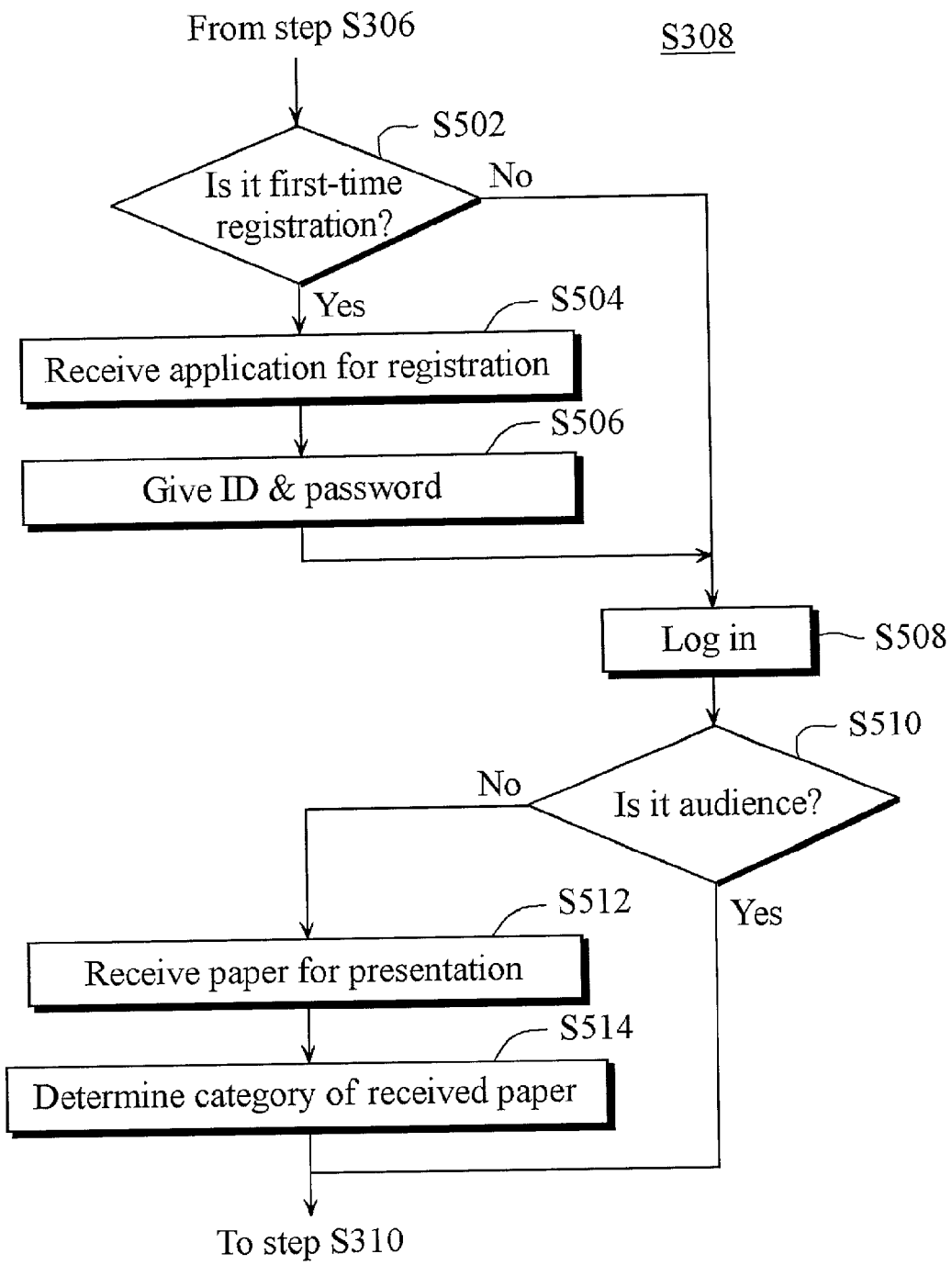
Figure 6:
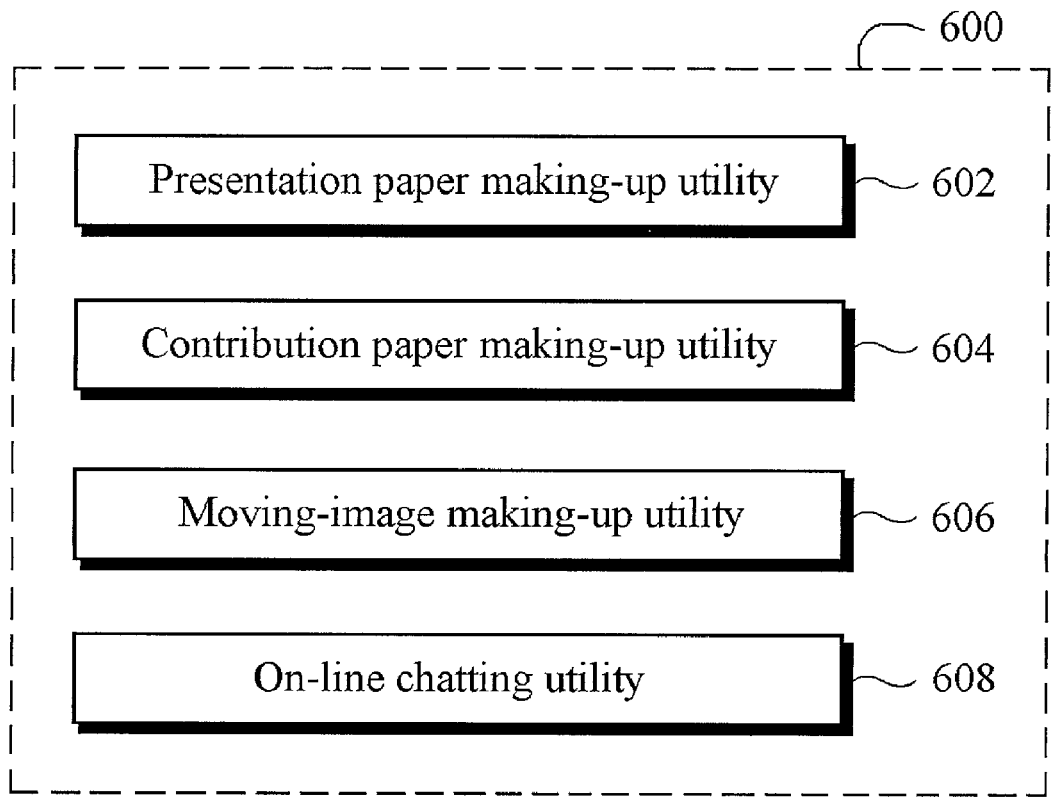

FIG. 4 exemplifies the constitution of a cyber-conference builder (CCB) program embodied on a computer-readable medium in accordance with the present invention;

FIG. 5 depicts a flow diagram for explaining a registration procedure shown in FIG. 3A; and FIG. 6 presents the constitution of a utility program embodied on a computer-readable medium in accordance with the present invention.

DETAILED DESCRIPTION OF THE PRESENT INVENTION

Now, a preferred embodiment in accordance with the present invention will be described with reference to FIGS. 1 to 6.

Figure 1:
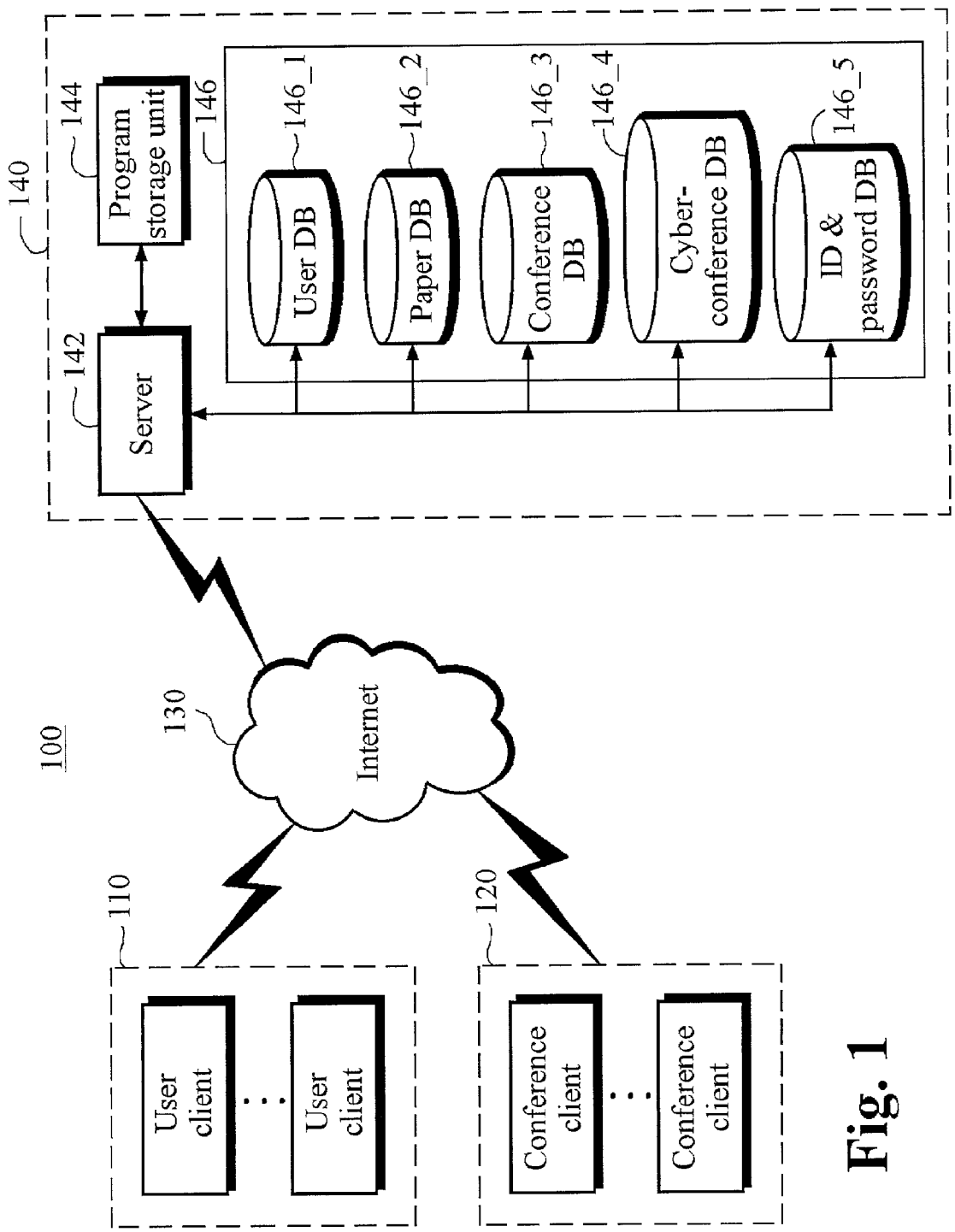
FIG. 1 shows a schematic block diagram of a system for operating a cyber-conference in cyberspace in accordance with the present invention.

FIG. 1 shows a schematic block diagram of a system for operating a cyber-conference in accordance with the present invention. As shown in FIG. 1, the system 100 comprises a plurality of user clients 110, a multiplicity of conference clients 120, and a cyber-conference operating apparatus 140. These are interconnected through a communication network, such as the Internet 130. It is noted that the Internet 130 should be interpreted and understood as a communication network in which conventional wire/wireless communication networks are interconnected.

The user clients 110 are computing devices serving to communicate with the apparatus 140 through the Internet 130 by using wire/wireless communication protocols. Lecturers, examiners, and audiences may use the user clients 110, in order to connect to the cyber-conference operating apparatus 140. The lecturers contribute and/or submit papers to meetings of the cyber-conferences; and the examiners appointed by operators of the cyber-conferences examine the papers contributed to the meetings.

It should be noted that the cyber-conference is implemented in cyberspace on behalf of a corresponding conference existing on off-line, so that the nature of the cyber-conference is identical to that of the corresponding conference. It is assumed that an operator of an conference existing on off-line operates a corresponding cyber-conference implemented in the cyberspace. It is noted that the cyberspace is the total interconnectedness of human beings through the computing devices and communication networks without regard to physical geography. Desktops, laptops, or any computers may implement the computing devices, i.e., the clients 110 and 120.

The conference clients 120 are computing devices serving to communicate with the cyber-conference operating apparatus 140 through the Internet 130. Operators who operate the cyber-conferences realized in the cyberspace may use the conference clients 120.

The apparatus 140 includes a server 142, a program storage unit 144, and a database 146, as shown in FIG. 1. The server 142, which is interconnected with the program storage unit 144 and the database 146, controls the operation of the program storage unit 144. Also, the server 142 manages data inputted to/outputted from the database 146 and communicates with the clients 110 and 120 through the Internet 130 by using wire/wireless communication protocols. The program storage unit 144 selectively provides a cyber-conference builder (CCB) program and a utility program to the clients 110 and 120 under the control of the server 142. The CCB program and the utility program will be described in detail with reference to FIGS. 4 and 6, respectively. The program storage unit 144 may also provide the clients 120 with a billing program.

The database 146 is made of a user database 146_1, a paper database 146_2, a conference database 146_3, a cyber-conference database 146_4, and an ID (identification) & password database 146_5, but is not limited thereto.

The user database 146_1 stores user-related data, wherein the users may be the lecturers, the examiners, and the audiences. For example, the user-related data are "NAME", "ADDRESS", "TELEPHONE NUMBER", "E-MAIL ADDRESS", "TECHNICAL SECTIONS", "MAJOR FIELD", "FIELD OF INTEREST", and the like for each user. The paper database 146_2 stores paper-related data including papers presented or contributed to meetings, and moving images, keywords, and/or lecture materials contained in the papers. The paper-related data are classified and stored depending on the conferences related to subjects of the papers.

The conference database 146_3 contains society-related data for the conferences having their cyber-conferences, such as "NAME OF CONFERENCE", "ORGANIZATION DATE", "ADDRESS", and the like. The society-related data may be obtained from the government authorities approving the establishment of the individual conference. The cyber-conference database 146_4 contains conference activity-related data for meetings of cyber-conferences currently being held, such as papers published in or contributed to the meetings, their authors, examiners, and participating status of audiences. After the meetings are closed, the papers of the conference activity-related data stored in the cyber-conference database 146_4 are transferred to and stored on the paper database 146_2 upon request of the operators of the cyber-conference. Alternatively, all of the conference activity-related data may be stored on a predetermined location of the conference clients 120.

The ID & password database 146_5 stores temporary IDs & passwords for the lectures, the examiners, and the audiences, and specific IDs & passwords for the conferences. The temporary and specific IDs & passwords can be given by the operators of the cyber-conferences under the control of the server 142.

Now, referring to FIGS. 2 to 6, it will be described in detail a method capable of constructing and operating the cyber-conference in accordance with the present invention.

Figure 2:
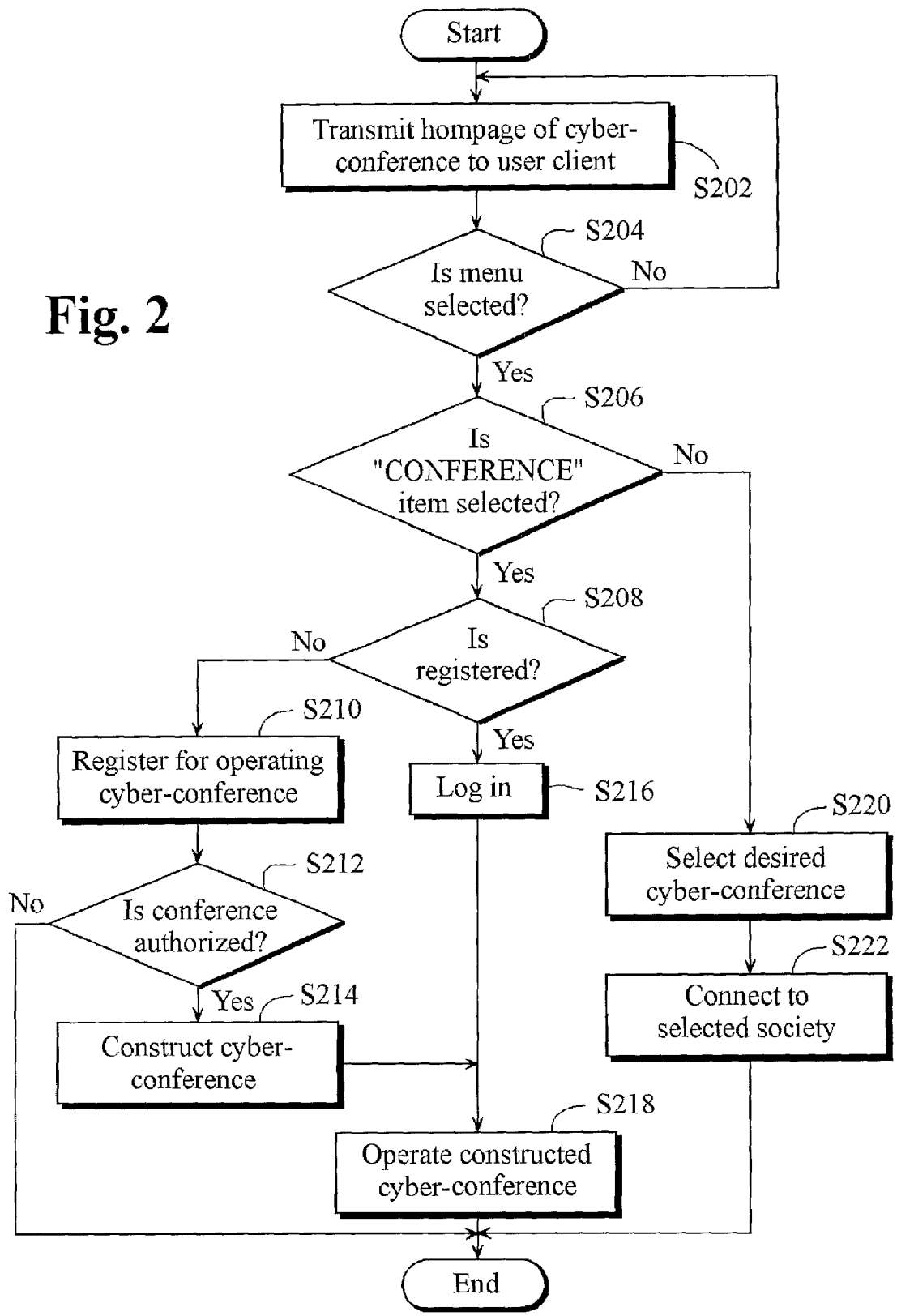
FIG. 2 represents a flow diagram of a method capable of constructing and operating the cyber-conference in accordance with the present invention.

FIG. 2 represents a flow diagram of a method for constructing and managing the cyber-conference in cyberspace through the cyber-conference operating apparatus 140 of FIG. 1 in accordance with the present invention.

At step S202, when a user using one of the user clients 110 (hereinafter, the user will be referred as the user client 110 for the sake of simplicity) and an operator using one of the conference clients 120 (hereinafter, the operator will be referred as the conference client 120 for the sake of simplicity) access to the cyber-conference operating apparatus 140, the server 142 of the apparatus 140 provides the user client 110 and the conference client 120, via the Internet 130, with a homepage of a cyber-conference website. The homepage is realized with a language, e.g., HTML (Hyper-Text Markup Language) and/or WML (Wireless Markup Language), to which the user client 110 and the conference client 120 can access, and also is provided with various contents.

At step S204, the server 142 determines whether a menu provided on the homepage is selected. It should be noted that the homepage will be described to provide "CONFERENCE" and "USER" items only on the menu for the sake of simplicity, but the skilled person in the art can fully understand that other items may be added on the menu, if necessary. It is also noted that "CONFERENCE" item is provided for the conference client 120 that is willing to operate a certain cyber-conference in the cyberspace; and "USER" item is provided to the user client 110 that is willing to participate in the cyber-conference or a meeting of the cyber-conference. In case that the determination result is negative at step S204, the procedure of the present invention returns to step S202; and, if otherwise, it proceeds to step S206.

At step S206, the server 142 determines whether "CONFERENCE" item on the menu is selected. If "CONFERENCE" item is selected, the inventive procedure goes to step S208; and, if otherwise, it proceeds to step S220.

At step S220, the server 142 transmits to the user client 110 a list of cyber-conferences being currently operated based on the conference activity-related data stored on the cyber-conference database 146_4, in order to allow the user client 110 to select a desired cyber-conference on the list.

In response, the server 142, at step S222, connects the user client 110 to the selected cyber-conference and the inventive procedure is terminated.

Meanwhile, at step S208, the server 142 checks whether the conference client 120 has registered to the cyber-conference operating apparatus 140, for constructing and operating a certain cyber-conference in the cyberspace. If the checked result is negative at step S208, the inventive procedure proceeds to step S210; and, if otherwise, it goes to step S216.

At step S210, the server 142 receives an application for registration from the conference client 120 and proceeds to step S212. The application is provided by the cyber-conference operating apparatus 140. For example, data to be filled in the application by the conference client 120 is "NAME OF CONFERENCE", "PRESIDENT", "CONFERENCE REGISTRATION NO.", "ADDRESS", and the like and stored on the conference database 146_3 under the control of the server 142. Optionally, after step S210, the server 142 determines whether the data filled in the application exists on the conference database 146_3, by comparing the data with the conference-related data stored on the conference database 146_3. If the data filled in the application exists already, the server 142 returns to step S208 and notifies to the conference client 120 the fact that it has been already registered to the cyber-conference operating apparatus 140; and, if otherwise, the server 142 goes to step S212. This step is provided for preventing double registration from operating a certain cyber-conference.

At step S212, the server 142 determines whether the conference client 120 applying for the registration is officially authorized from the government authority where the conference has been established on off-line, based on the data filled in the application and the conference-related data stored on the conference database 146_3. If the determination result is negative at step S212, the inventive procedure is terminated; and, if otherwise, it goes to step S214.

At step S214, after the server 142 assigns a specific ID and password to the conference client 120, the conference client 120 constructs a cyber-conference in the form of, e.g., a website by using the CCB program provided from the program storage 114 under the control of the server 142.

At step S218, the conference client 120 operates the constructed cyber-conference and the inventive procedure is terminated. The detailed description of the construction and operation process for the constructed cyber-conference will be discussed with reference to FIGS. 3A and 3B.

Meanwhile, if the determination result is positive at step S208, the inventive procedure proceeds to step S216, as described above. At step S216, the conference client 120 logs in the cyber-conference by using the specific ID and password previously assigned from the server 142, and proceeds to step S218 to perform the operation described above.

Now, the construction and operation process of the cyber-conference will be described in detail with reference to FIGS. 3A and 3B.

First, at step S302 of FIG. 3A, the conference client 120 constructs the cyber-conference by using the CCB program provided from the program storage 144 under the control of the server 142, wherein the conference client 120 has obtained the right to construct and operate the cyber-conference from the server 142. The constructed cyber-conference may provide contents of, e.g., "OPENING AND CLOSING DATE OF CYBER-CONFERENCE MEETING", "MEETING LOCATION", "TECHNICAL SECTION", "CONTRIBUTOR AND TITLE OF PAPER", "NOTICE", "BULLETIN BOARD", "COUNCIL", and "JOURNAL PUBLICATION STATUS".

At step S304, the conference client 120 operating the constructed cyber-conference determines whether it is time to hold a meeting. If the determination result is negative at step S304, the inventive procedure proceeds to step S316 of FIG. 3B through a tap A; and, if otherwise, it goes to step S306.

At step S306, the conference client 120 gives the right for accessing the cyber-conference to users, e.g., paper examiners and lecturers, invited to the meeting. Specifically, the conference client 120 provides the users with temporary IDs and passwords capable of attending to the meeting being held or to be held under the control of the server 142. Then, the temporary IDs and passwords given to the users are stored on the ID & password database 146_5 of FIG. 1 and can be set to expire automatically as the meeting is closed.

At step S308, the conference client 120 receives registrations for participating the meeting from paper contributors and/or audiences. Similar to step S306, the conference client 120 gives temporary IDs and passwords to the contributors and/or the audiences completing the registration. The detailed description of step S308 will be discussed with reference to FIG. 5.

At step S310, the conference client 120 checks whether it is an opening date of the meeting. If the checked result is negative at step S310, the inventive procedure returns to step S308; and, if otherwise, it proceeds to step S312.

At step S312, the conference client 120 holds the meeting in the cyberspace; and, after closing the meeting, the inventive procedure goes to step S314.

At step S314, the conference client 120 notifies the closing of the meeting to the server 142, and the inventive procedure is terminated.

Figure 3B:
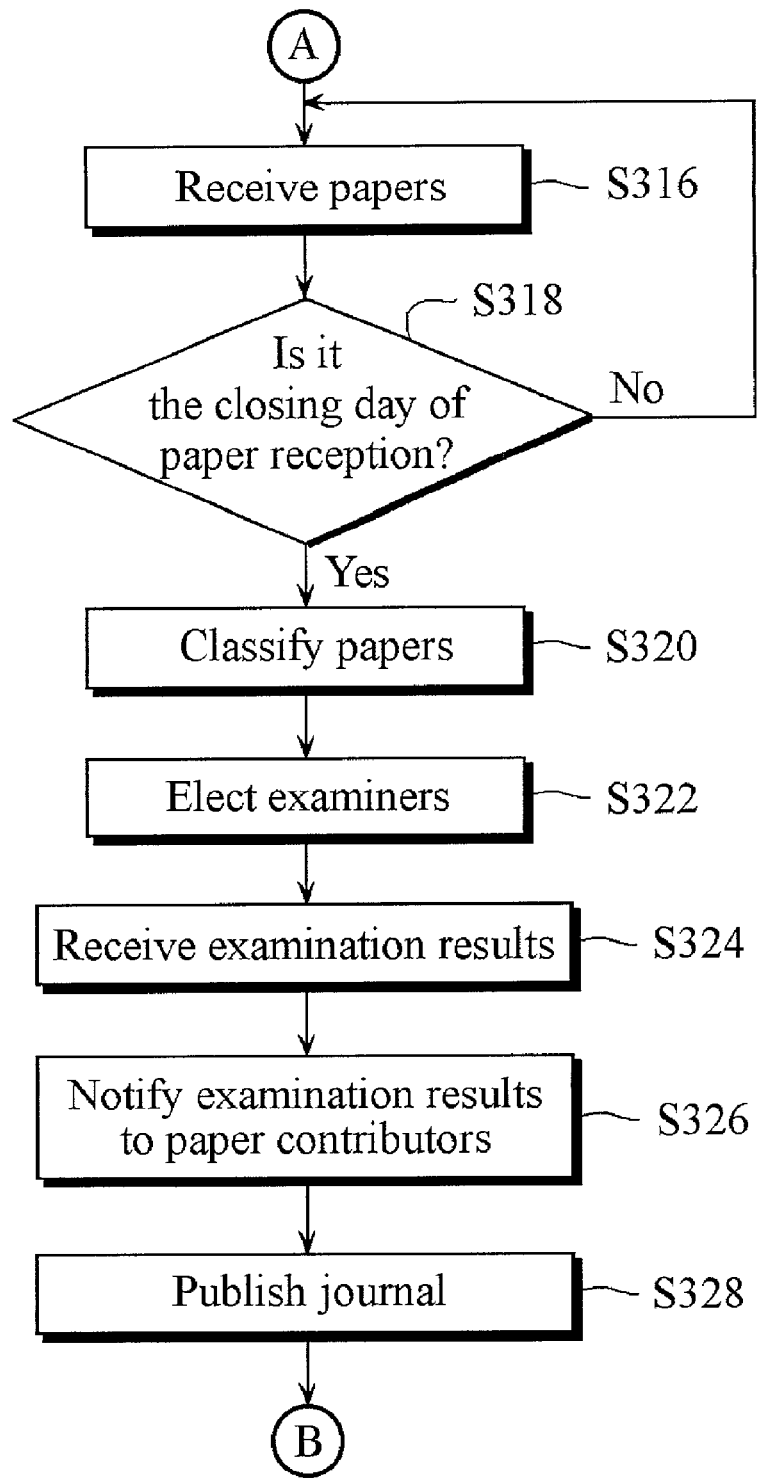

Meanwhile, at step S316 of FIG. 3B, the conference client 120 receives papers from the paper contributors completing the registration. The received papers are processed by the conference client 120 using a utility program 600 provided from the program storage 144 under the control of the server 142. The utility program 600 will be discussed in detail with reference to FIG. 6. The received papers are temporarily stored as the conference activity-related data on the cyber-conference database 146_4 shown in FIG. 1 until the closing day of paper reception.

At step S318, the conference client 120 checks whether it is the closing day of paper reception. If the checked result is negative at step S318, the inventive procedure returns to step S316 to keep receiving papers; and, if otherwise, it proceeds to step S320.

At step S320, the conference client 120 classifies the received papers into their corresponding categories depending on technical sections of the cyber-conference.

At step S322, the conference client 120 elects examiners who will examine the classified papers based on the user-related data stored on the user database 146_1 of FIG. 1, wherein the user-related data contains a major field of the individual examiners. Then, the elected examiners examine the papers assigned thereto and notify the examination results of the papers to the conference client 120. Optionally, the audiences completing the registration may perform the paper-examination, wherein an evaluation basis related to the paper-examination by the audiences is previously prepared by the conference client 120.

At step S324, the conference client 120 receives the examination results from the elected examiners and/or the audiences. Then, the conference client 120 determines passed and non-passed papers among the examined papers based on the received examination results.

At step S326, the conference client 120 notifies the received examination results and the publication decision to the corresponding paper contributors.

At step S328, the conference client 120 publishes a journal including the passed papers, and the inventive procedure is terminated. The journal can be published on off-line and/or on-line.

Referring to FIG. 4, there is shown the constitution of the CCB program 400 stored on the program storage unit 144 of FIG. 1 in accordance with the present invention. As shown in FIG. 4, the CCB program 400 is made of a cyber-conference creation program 410, an access-permitting program 420, a meeting opening/closing program 430, a paper presentation/on-line chatting linking program 440, and a database-building program 450.

The cyber-conference creation program 410 contains not only a web page building tool for use in the creation of the cyber-conference, but also has the utility program 600 shown in FIG. 6. The access-permitting program 420 is used for effectively managing the cyber-conference and its meeting. Specifically, by using the access-permitting program 420, the operator of the cyber-conference gives the right for supervising and controlling the cyber-conference to individual executives, e.g., the chief of each technical section, elected by the operator.

The meeting opening/closing program 430 is used for opening/closing ceremonies of the meeting held in the cyberspace, including awarding prizes, and provides real-time broadcasting and chatting tools. The paper presentation/on-line chatting linking program 440 is a tool for supporting the audiences to take the presentation of a specific paper or to listen to lectures, while the meeting is holding, and also to exchange opinions with the presenters or the lectures for the sake of academic development. The database-building program 450 is a tool for storing presented papers, materials for lectures, and chatting contents about the presented papers in the closed meeting on the paper database 146_2 or on a predetermined place of the conference client 120, so that members of the cyber-conference can retrieve them through the Internet 130 after the meeting is closed.

FIG. 5 depicts a flow diagram for explaining a registration procedure in detail shown in FIG. 3A.

At step S502, the conference client 120 checks whether the user client 110 intending to participate in the meeting is a member or a first-time visitor. If the checked result is positive at step S502, i.e., the user client 110 is the first-time visitor and needs to register, the inventive procedure proceeds to step S504; and, if otherwise, it goes to step S508.

At step S504, the conference client 120 receives an application for registration from the user client 110.

At step S506, the conference client 120 provides the user client 110 with a temporary ID and password under the control of the server 142.

At step S508, the user client 110 logs in the cyber-conference by using the temporary ID and password provided from the conference client 120. Here, the temporary ID and password of the user client 110 are stored on the ID & password database 146_5 of FIG. 1.

At step S510, the conference client 120 determines whether the user client 110 logging in at step S508 is a paper presenter or an audience. If the user client 110 is an audience, the inventive procedure goes to step S310 of FIG. 3A to perform the operation described above; and, if otherwise, it proceeds to step S512.

At step S512, the conference client 120 receives a presenting paper from the user client 110 logging in at step S508. The received paper for presentation is made-up with the utility program 600 provided from the program storage unit 144.

Thereafter, at step S514, the conference client 120 decides a category of the received paper, i.e., a corresponding technical section of the cyber-conference; and, the inventive procedure goes to step S310 of FIG. 3A to perform the operation described above.

Referring to FIG. 6, there is presented the constitution of the utility program 600 embodied on a computer-readable medium in accordance with the present invention. The utility program 600 includes a presentation paper making-up utility 602, a contribution paper making-up utility 603, a moving-image making-up utility 606, and an on-line chatting utility 608.

The presentation paper making-up utility 602 is used when a presenter prepares for a paper to be presented in the meeting of the cyber-conference. The contribution paper making-up utility 603 is used when a paper contributor prepares for a paper to be contributed in the journal. The moving-image making-up utility 606 is used to add moving images and/or materials for lectures in the presentation paper and/or the contribution paper, and is effective in detailed explanation to the audiences and the examiners of the papers, in order to promote comprehensive understanding of the subject matter to study. The on-line chatting utility 608 is used for exchanging opinions with the audiences and the presenters at a presentation time. Alternatively, the paper presenter can also use a conventional utility program, e.g., a word processing program, provided on the user client 110.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

What is claimed is:

1. A method for creating and operating a cyber-conference with a system having a user client, a conference client, a cyber-conference operation server, a program storage unit and a database, comprising the steps of:
   a) accessing, at the conference client, a cyber-conference operating website provided by the cyber-conference operation server;
   b) applying for registration, at the conference client, to the cyber-conference operation server;
   c) approving, at the cyber-conference operation server, the registration based on data stored on the database, in response to the application for registration from the conference client;
   d) creating, at the conference client, a cyber-conference through the communication network by using a cyber-conference creation program stored on the program storage unit;
   e) providing, at the cyber-conference operation server, the user client with a contribution paper making-up utility;
   f) receiving, at the conference client, a paper from the user client, wherein said paper has been written using the contribution paper making-up utility of step (e); and
   g) publishing, at the conference client, a journal of papers presented during the cyber-conference including the paper of step (f).

2. The method of claim 1, further comprising the steps of:
   h) holding, at the conference client, a meeting of the created cyber-conference; and
   i) processing, at the conference client, data related to the meeting.

3. The method of claim 1, wherein the step c) includes the steps of:
   c1) assigning, at the cyber-conference operation server, a specific access code to the conference client by using a predetermined algorithm; and
   c2) logging in, at the conference client, the cyber-conference operating website with the specific access code assigned by the cyber-conference operation server.

4. The method of claim 1, wherein the step d) includes the steps of:
   d1) creating, at the conference client, for the cyber-conference based on a cyber-conference building program; and
   d2) providing, at the conference client, contents for the cyber-conference.

5. The method of claim 2, wherein the step h) includes the steps of:
   h1) setting, at the conference client, opening/closing date of the meeting; and
   h2) providing, at the conference client, technical sections of the cyber-conference.

6. The method of claim 5, wherein the step h) further includes the steps of:
   h3) receiving, at the conference client, an application of participation to the meeting from the user client;
   h4) assigning, at the conference client, a temporary access code to the user client completing the application under the control of the cyber-conference operation server; and
   h5) receiving, at the conference client, data to be presented in the meeting from the user client completing application.

7. The method of claim 6, wherein the step h5) has the step of:
  h51) classifying, at the conference client, the received data depending on the technical sections to store the same on a predetermined location.

8. A system for creating and operating a cyber-conference, the system comprising:
  a user client;
  a means for storing a program to be used in creating and operating the cyber-conference and a contribution paper making-up utility to be provided to the user client;
  a database for storing data related to the cyber-conference;
  a conference client for receiving a paper from the user client and publishing a journal of papers presented during the cyber-conference including the paper written using the contribution paper making-up utility;
  a server connected to the storing means and the database, wherein the server enables the conference client to create and operate the cyber-conference, by using the data stored on the storing means and the database, when the conference client requests for operating the cyber-conference.

9. The system of claim 8, wherein the program includes:
  a first code segment for enabling the conference client to construct the cyber-conference;
  a second code segment for enabling the user client to access the cyber-conference; and
  a third code segment for enabling the conference client to manager data related to the cyber-conference.

10. The system of claim 8, wherein the database includes:
  a first portion for storing data related to the conference client;
  a second portion for storing data related to the user client; and
  a third portion for storing data related to the cyber-conference.

* * * * *